United States Patent
Spiro et al.

[11] Patent Number: 5,683,062
[45] Date of Patent: Nov. 4, 1997

[54] AIRCRAFT ANTI-INSECT SYSTEM

[75] Inventors: Clifford Lawrence Spiro; Thomas Frank Fric, both of Niskayuna, N.Y.; Ross Michael Leon, Cincinnati, Ohio

[73] Assignee: General Electric Company, Schenectady, N.Y.

[21] Appl. No.: 395,028

[22] Filed: Feb. 27, 1995

[51] Int. Cl.⁶ ............................. B64C 1/38; B64D 15/04
[52] U.S. Cl. ...................... 244/121; 244/134 F; 244/130; 60/39.092; 60/39.093
[58] Field of Search .................. 244/53 B, 121, 244/134 B, 134 C, 134 E, 130; 60/39.092, 39.093

[56] References Cited

U.S. PATENT DOCUMENTS

| | | | |
|---|---|---|---|
| 2,747,365 | 5/1956 | Rainbow | 60/39.093 |
| 3,057,154 | 10/1962 | Sherlaw et al. | 60/39.09 |
| 3,933,327 | 1/1976 | Cook et al. | 294/134 R |
| 4,482,114 | 11/1984 | Gupta et al. | 244/53 B |
| 4,674,714 | 6/1987 | Cole et al. | 244/134 B |
| 5,011,098 | 4/1991 | McLaren et al. | 60/39.093 |
| 5,088,277 | 2/1992 | Schulze | 60/39.093 |

FOREIGN PATENT DOCUMENTS

| | | |
|---|---|---|
| 436243 | 7/1991 | European Pat. Off. |
| 622627 | 5/1949 | United Kingdom |
| 721987 | 1/1955 | United Kingdom |
| 2204097 | 4/1987 | United Kingdom |
| 2224779 | 10/1989 | United Kingdom |
| 2264917 | 3/1993 | United Kingdom |

*Primary Examiner*—Andres Kashnikow
*Assistant Examiner*—Virna Lissi Mojica
*Attorney, Agent, or Firm*—William H. Pittman

[57] ABSTRACT

Insect debris is removed from or prevented from adhering to insect impingement areas of an aircraft, particularly on an inlet cowl of an engine, by heating the area to 180°–500° C. An apparatus comprising a means to bring hot air from the aircraft engine to a plenum contiguous to the insect impingement area provides for the heating of the insect impingement areas to the required temperatures. The plenum can include at least one tube with a plurality of holes contained in a cavity within the inlet cowl. It can also include an envelope with a plurality of holes on its surface contained in a cavity within the inlet cowl.

17 Claims, 3 Drawing Sheets

AIRCRAFT ANTI-INSECT SYSTEM

This invention was made with government support under Contract No. NAS3-26617 awarded by NASA. The government has certain rights in this invention.

BACKGROUND OF THE INVENTION

This invention relates to an anti-insect apparatus for an aircraft. More specifically, it relates to an apparatus for heating an aircraft engine inlet cowl to the point that insect debris adhering to the inlet cowl becomes less adherent and spalls or, alternatively, heating to the point that upon impact the insect fails to adhere. It further relates to a method for removing insect debris from the aircraft or preventing insect debris adherence.

To reduce drag on an aircraft and to increase fuel efficiency, aircraft surface roughness must be minimized. Increased surface roughness has a direct effect on drag. In addition roughness or disturbances can make a boundary layer turbulent, which has the effect of increased drag also. One contributor to aircraft surface roughness is insect contamination. When the insect collides with the aircraft, the insect cuticle ruptures. The insect fluid bonds the ruptured cuticle to the surface forming a disturbance that increases drag. A typical limit on surface uniformity is 0.05 mm. Debris from insect impact is often several times this height.

Insect contamination usually occurs on aircraft at altitudes below about 150 m, corresponding to take-off and initial climb. Insects can also be accumulated during landing and will impact subsequent flights unless they are removed while the plane is on the ground.

The prior art uses warm air from the engine as an anti-ice system. A typical anti-ice system has warm air introduced into a chamber within the leading edge of the inlet cowl. This warm air, typically brought to the inlet cowl from an intermediate compressor stage of the engine, generally heats the leading edge of the inlet cowl to a temperature of 65° to 120° C. The anti-ice system typically consists of one circumferential "piccolo tube" air jet manifold in a channel adjacent to the nacelle lip, such as is disclosed in U.S. Pat. No. 3,057,154. U.S. Pat. No. 3,933,327 teaches the use of a plenum for de-icing, while U.S. Pat. No. 5,088,277 discloses air ejector nozzles to prevent and remove ice accumulation from the leading edge of an inlet cowl.

SUMMARY OF THE INVENTION

In accordance with the present invention, there is provided a method of suppressing adherence of insect debris to an insect impingement area which comprises heating the insect impingement area to a temperature of 180°–500° C.

According to another aspect of the present invention, there is provided an anti-insect apparatus comprising:

a. an insect impingement area capable of withstanding temperatures up to about 500° C., and, b. a means for heating the insect impingement area sufficient to maintain the temperature of the insect impingement area at 180°–500° C.

Figure 2:
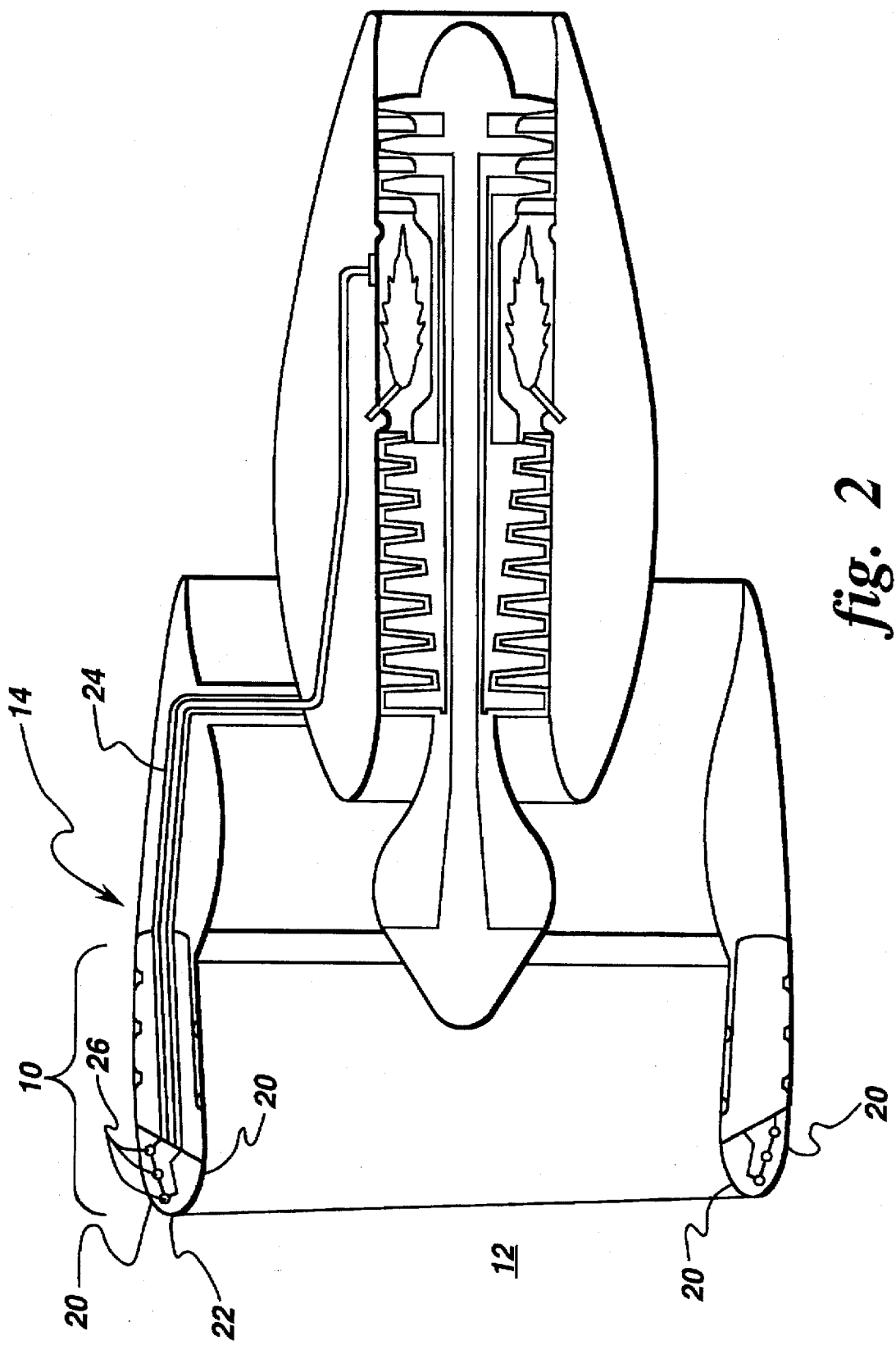

Depicted in FIG. 2 is an embodiment of the present invention indicating the use of at least one tube to deliver warm air sufficient for heating the insect impingement area of the inlet cowl.

Figure 3:
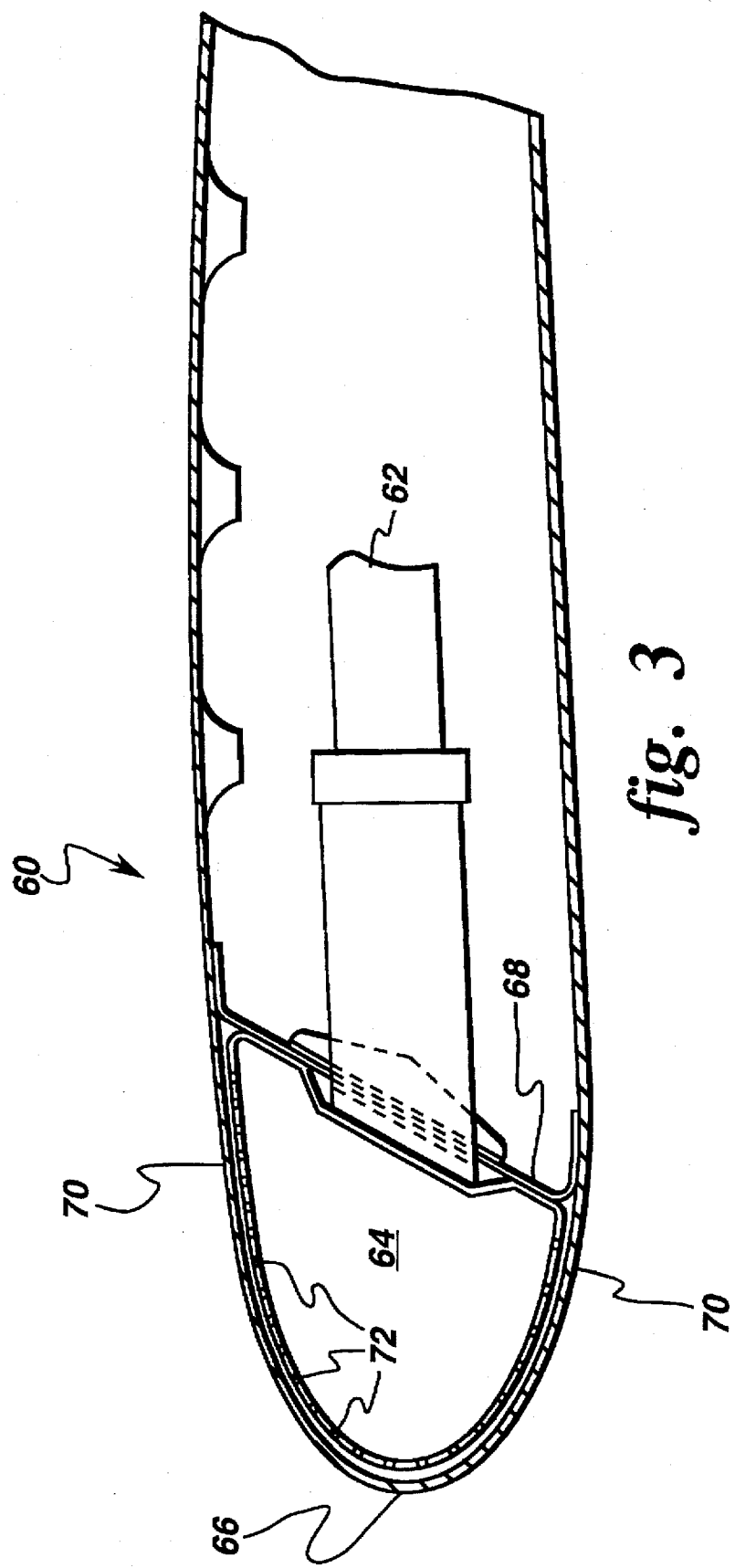

In FIG. 3, a second embodiment of the present invention is presented which shows the use of an envelope to deliver warm air to the insect impingement area of the inlet cowl.

DESCRIPTION OF THE PREFERRED EMBODIMENTS

The method of the current invention requires heating of an insect impingement area of an aircraft to 180°–500° C. The apparatus disclosed in this invention includes an insect impingement area and a means for heating the insect impingement area.

Certain areas of the aircraft, such as the leading edges of wings, empennages and inlet cowls, are particularly susceptible to insect accumulation. The insect impingement areas are those areas of the aircraft that are prone to collecting insect debris as the insects collide with the aircraft. Of particular concern with this invention is the insect impingement area on an inlet cowl 10 (FIG. 2). The inlet cowl 10 is the forward most section of a nacelle 14 of an aircraft engine 12. The insect impingement area 20 includes the forward lip 22 of the inlet cowl 10 and both the inner and outer surfaces of the inlet cowl.

The present invention suppresses the adherence of insects to aircraft surfaces. This suppression is accomplished in one of two ways: by preventing adhesion or by removing insect debris after it is deposited on the aircraft surface.

To prevent the adhesion of insects, heating of the insect impingement area 20 occurs at takeoff and landing, typically at altitudes of less than 150 m. With this method, heating can be discontinued after the plane has reached higher altitudes.

Preferably, heating of the insect impingement area 20 occurs after takeoff when the engines 12 are no longer at maximum thrust, but before the aircraft reaches cruise. Cruise is the segment of the flight when the plane has reached its most efficient operation. It occurs after the plane has completed its climb and before it begins its descent. This optimum time for heating would typically occur before the plane reached an altitude of 1525 m. At these lower altitudes, the aircraft does not require the full thrust of the engine 12 and it is not at such an elevation that the air temperature is too low to reduce the effective heating of the insect impingement area 20. When heating in this manner, any insect debris on the insect impingement area 20 can be removed.

Insect debris can also be removed by heating after the plane has reached its cruising altitude. Again, insect debris on the insect impingement area 20 is removed, reducing drag across the aircraft surfaces during cruise.

Continuous or intermittent heating can be used. Continuous heating can be applied to the insect impingement area 20 throughout takeoff or landing, for example. Alternatively, intermittent heating can be used. The heating can be cycled on and off in a manner determined to be most effective. This cycling could be computer aided to be most efficient.

Heating can be accomplished by any method, including resistive heating, radiative heating, conductive heating and convective heating and any combination thereof. Resistive heating can be supplied by heating bands, cartridge heaters or other methods known in the art. Methods of radiative heating include quartz lamps and other techniques known in the art.

Preferably, warm air from the aircraft engine can be brought to an insect impingement area via ducting to provide convective heating. This warm air can be forced from the ducting into a plenum, which is defined as any enclosed space contiguous to the insect impingement area. The plenum must be situated relative to the insect impingement area in such a manner as to promote heating of the insect impingement area. The plenum may or may not be in direct contact with the insect impingement area.

Figure 1:
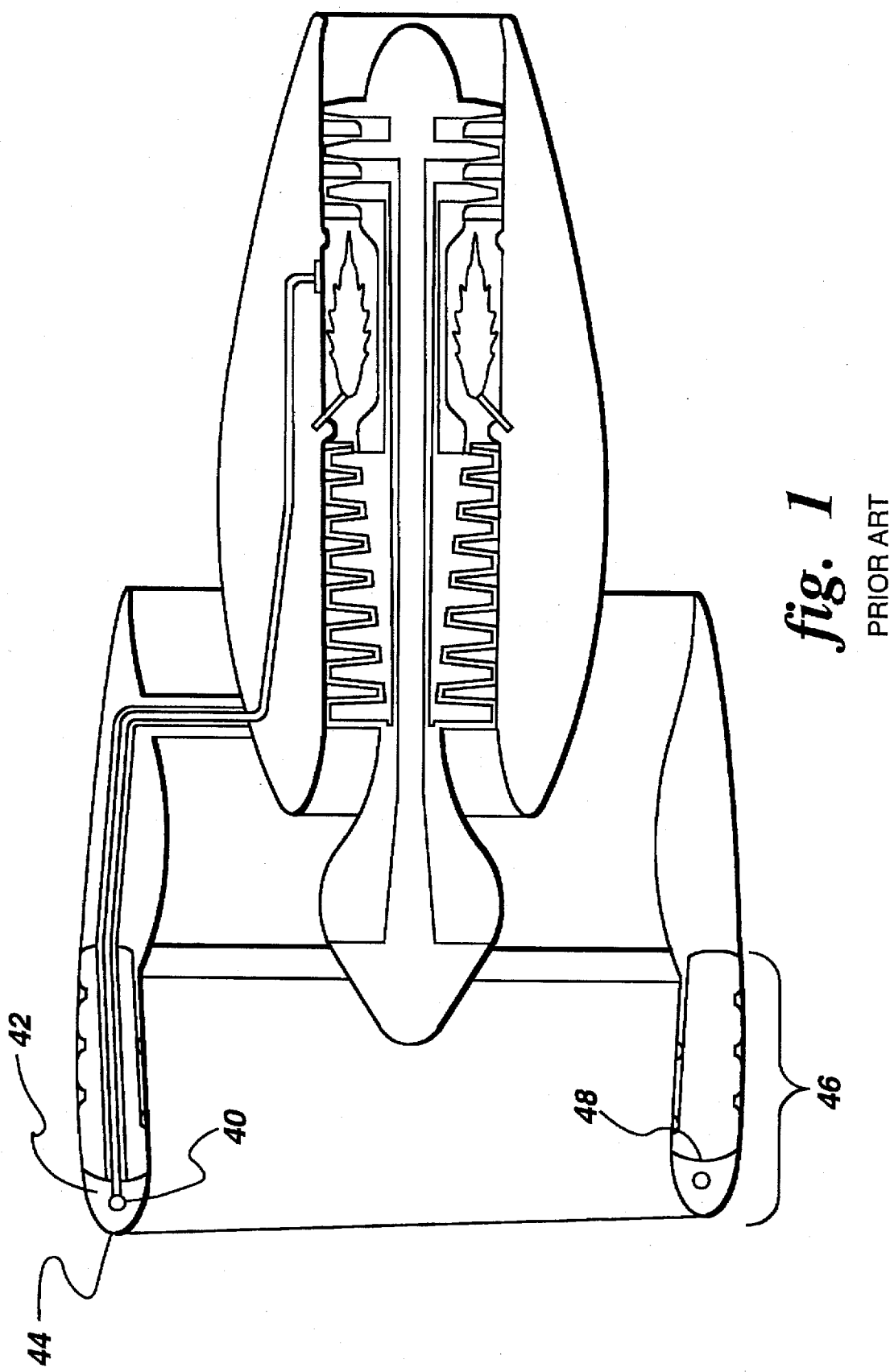
FIG. 1 is a diagram of an aircraft engine depicting the prior art use of a single "piccolo tube" air jet manifold as an anti-ice system to warm the inlet cowl lip.

When the insect impingement area 20 is found on the inlet cowl 10, the plenum can comprise at least one tube 26, preferably more than one tube. The anti-ice system that constitutes the prior art typically consists of one circumferential "piccolo tube" air jet manifold 40 (FIG. 1) in a cavity 42 formed between a lip 44 of the inlet cowl 46 and a bulkhead 48 inside the inlet cowl 46. In the present invention, the tube(s) 26 (FIG. 2) must withstand higher air temperatures and possibly pressures than the prior art anti-ice system tube 40 (FIG. 1). This ensures that the insect impingement area 20 (FIG. 2) is heated to the proper temperature. The insect impingement area 20 of the inlet cowl 10 may extend further aft than the inlet cowl lip 44 (FIG. 1) of the predecessor anti-ice system. The tube(s) 26 (FIG. 2) should be of sufficient size and in sufficient number to ensure adequate heat transfer to bring the temperature of the insect impingement area 20 to 180°–500° C. The size and number of holes in the tube(s) 26 are also determined by the heat transfer requirements.

Convective heating of an inlet cowl 60 (FIG. 3) can also be accomplished by bringing hot air from the engine via ducting 62 into an envelope 64 that substantially fills a cavity formed between a lip 66 of the inlet cowl 60 and a bulkhead 68 inside the inlet cowl 60. This envelope 64, or any part of it, may or may not be in direct contact with the insect impingement area 70. The surface of the envelope 64 may be penetrated with holes 72 either over the entire surface of the envelope or any part of the surface. The holes 72 should be of sufficient size and in sufficient number to ensure adequate heat transfer to bring the temperature of the insect impingement area 70 to 180°–500° C. The size and number of holes 72 in the surface of the envelope 64 are also determined by the heat transfer requirements.

In the prior art, much of an aircraft's body, including the inlet cowl 46 (FIG. 1), is typically made of an aluminum alloy. Materials that are capable of withstanding the higher temperatures required by the present invention can be substituted for the aluminum. These materials include stainless steel and titanium and titanium alloys.

Coatings can be applied to the insect impingement area 20 (FIG. 2) to enhance the anti-insect properties of the apparatus. Coatings can be chosen which prevent adhesion of the insects during the heating and/or they can be chosen to prevent pitting and scratching of the insect impingement area 20 over a long service life of the aircraft. Coatings that exhibit such properties are well known in the art. They include materials such as diamond-like carbon and nickel and nickel alloys.

The following examples are presented to enable those skilled in the art to more clearly understand and practice the present invention. These examples should not be considered as a limitation upon the scope of the present invention, but merely as being illustrative and representative thereof.

EXAMPLE 1

A wind tunnel was constructed that was equipped with an insect delivery system. Mosquitoes were deposited at a insect impingement velocity of 65–90 m/s onto a 304 stainless steel plate at room temperature. The insect debris was analyzed by profilometry. Several loci of debris exceeded the 0.05 mm requirement.

The sample was heated on a hot plate in 30° C. intervals. A hand-held air gun jet was used to blow air over the sample and to determine whether adhesion had been affected by thermolysis. At a temperature of 180° C., a substantial fraction of the coarse debris was rejected. Some discoloration of the insect debris was noted at 260° C. There was significant charring and rejection of the debris when the temperature reached 400° C. No obvious changes were noted in the temperature range from 400° to 480° C. Profilometry measurements indicated that after heating in this sequence, 100% of the remains were below the required 0.05 mm and the average debris height was reduced to less than 0.013 mm.

EXAMPLE 2 (Control)

Using the wind tunnel and insect delivery system described in Example 1, house flies were deposited onto room temperature test plates. One hundred percent of the insect impacts with the plate resulted in rupture of the insects and deposition of debris. The maximum reading possible with the profilometer was 0.36 mm, this debris measured at least 0.36 mm. Visual inspection indicated that the height of the debris was in excess of 0.51 mm.

EXAMPLE 3

A test plate assembly consisting of six heaters totaling 5400 watts enclosed in a copper block and insulated at the sides with ceramic plates was used. The test plate assembly was heated first, and then house flies were injected using the wind tunnel and insect delivery system described in Example 1. For a test plate surface temperature of 370° C. and an insect impingement velocity of 67 m/s, house fly debris remaining on the test plate was significantly reduced compared to the control results detailed in Example 2. With approximately two dozen insects striking the surface, only about six had debris heights greater than 0.05 mm. These six typically had heights of approximately 0.08 mm.

EXAMPLE 4

A test was conducted using the wind tunnel and insect delivery system described in Example 1 and the test plate assembly heating method described in Example 3. The test plate assembly temperature was 370° C., and the insect impingement velocity was 50 m/s. Profilometry showed residue heights typically of approximately 0.05 mm. Only a small percentage of strikes created residues that were greater than 0.05 mm.

EXAMPLE 5

Another test was conducted using the wind tunnel and insect delivery system described in Example 1 and the test plate assembly heating method described in Example 3 wherein a test plate was heated to a surface temperature of 450° C. The insect impingement velocity was 67 m/s. Of the more than two dozen insect strikes onto the test plate, no debris greater than 0.03 mm was measured.

What is claimed is:

1. A method of suppressing adherence of insect debris to an insect impingement area of an aircraft which comprises heating the insect impingement area to a temperature of 180°–500° C.

2. A method in accordance with claim 1 wherein said insect impingement area comprises a surface on an aircraft engine inlet cowl.

3. A method in accordance with claim 1 wherein said heating occurs during flight of said aircraft at altitudes of less than 1525 m.

4. A method in accordance with claim 1 wherein said heating occurs during flight of said aircraft at altitudes of less than 150 m.

5. A method in accordance with claim 1 wherein said heating occurs during cruise of said aircraft.

6. A method in accordance with claim 1 wherein said heating is accomplished by a method selected from the group consisting of resistive heating, radiative heating, conductive heating, convective heating and combinations thereof.

7. A method in accordance with claim 2 wherein the heating comprises convective heating resulting from transporting gases from an aircraft engine into at least one tube with a plurality of holes, said tube contained in a cavity formed between the outer skin of the insect impingement area and a bulkhead within the inlet cowl.

8. A method in accordance with claim 2 wherein the heating comprises convective heating resulting from transporting gases from an aircraft engine into an envelope which substantially fills a cavity formed between the outer skin of the insect impingement area and a bulkhead within the inlet cowl, said envelope having a plurality of holes penetrating its surface.

9. An anti-insect apparatus comprising:

(a) an insect impingement area of an aircraft, capable of withstanding temperatures up to about 500° C. and, (b) a means for heating the insect impingement area sufficient to maintain the temperature of the insect impingement area at 180°–500° C.

10. An anti-insect apparatus in accordance with claim 9 wherein said insect impingement area has a coating.

11. An anti-insect apparatus in accordance with claim 10 wherein said coating comprises diamond-like carbon.

12. An anti-insect apparatus in accordance with claim 9 wherein said insect impingement area comprises a surface on an aircraft engine inlet cowl.

13. An anti-insect apparatus in accordance with claim 9 wherein said insect impingement area is manufactured of stainless steel.

14. An anti-insect apparatus in accordance with claim 9 wherein said insect impingement area is manufactured of titanium or alloys thereof.

15. An anti-insect apparatus in accordance with claim 12 wherein said means for heating comprises a means for transporting hot gases from an aircraft engine to at least one tube with a plurality of holes, said tube being contained in a cavity formed between the outer skin of the insect impingement area and a bulkhead within an inlet cowl.

16. An anti-insect apparatus in accordance with claim 12 wherein said means for heating comprises a means for transporting hot gases from an aircraft engine to an envelope which substantially fills a cavity formed between the outer skin of the insect impingement area and a bulkhead within an inlet cowl, said envelope having a plurality of holes penetrating its surface.

17. An anti-insect apparatus in accordance with claim 10 wherein said coating comprises Ni or alloys thereof.

* * * * *